United States Patent
Kondo et al.

(10) Patent No.: US 9,902,281 B2
(45) Date of Patent: Feb. 27, 2018

(54) CHARGER AND CHARGING METHOD

(71) Applicant: NEC Corporation, Tokyo (JP)

(72) Inventors: Yasuaki Kondo, Tokyo (JP); Daisuke Shigematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 208 days.

(21) Appl. No.: 13/984,798

(22) PCT Filed: Mar. 6, 2013

(86) PCT No.: PCT/JP2013/056131
§ 371 (c)(1),
(2) Date: Aug. 9, 2013

(87) PCT Pub. No.: WO2013/161395
PCT Pub. Date: Oct. 31, 2013

(65) Prior Publication Data
US 2014/0055091 A1    Feb. 27, 2014

(30) Foreign Application Priority Data

Apr. 27, 2012 (JP) ................. 2012-102926

(51) Int. Cl.
*H02J 7/00* (2006.01)
*B60L 11/18* (2006.01)
(Continued)

(52) U.S. Cl.
CPC ......... *B60L 11/1848* (2013.01); *B60L 3/0069* (2013.01); *B60L 11/1816* (2013.01);
(Continued)

(58) Field of Classification Search
USPC .......................................... 320/109
See application file for complete search history.

(56) References Cited

U.S. PATENT DOCUMENTS

2009/0287578 A1    11/2009 Paluszek et al.
2010/0010685 A1    1/2010 Kang
(Continued)

FOREIGN PATENT DOCUMENTS

JP    H06-318288 A    11/1994
JP    H10-14014 A    1/1998
(Continued)

OTHER PUBLICATIONS

The Second Part, Battle for Standardization, Japanese Enterprise Looks China, and Thereby Standardized in America, Nikkei Electronics, Mar. 22, 2010, No. 1026, pp. 48-55.
(Continued)

*Primary Examiner* — Mohammed Alam
(74) *Attorney, Agent, or Firm* — Wilmer Cutler Pickering Hale & Dorr

(57) ABSTRACT

The present invention is applied to a charger that charges a rechargeable battery mounted on an electric vehicle. The charger according to the present invention includes an electric power supply unit that supplies electric power to said rechargeable battery; a payment unit that makes payment with electronic money to use said charger; and a control unit, when said control unit is instructed by said electric vehicle to start charging, that instructs said electric power supply unit to start supplying electric power to said rechargeable battery and that instructs said payment unit to make payment with said electronic money.

4 Claims, 3 Drawing Sheets

(51) Int. Cl.
  *G06Q 20/14* (2012.01)
  *G07F 15/00* (2006.01)
  *G06Q 30/04* (2012.01)
  *G06Q 50/06* (2012.01)
  *B60L 3/00* (2006.01)
  *H01M 10/44* (2006.01)

(52) U.S. Cl.
  CPC ....... *B60L 11/1824* (2013.01); *B60L 11/1846* (2013.01); *B60L 11/1861* (2013.01); *G06Q 20/145* (2013.01); *G06Q 30/04* (2013.01); *G06Q 50/06* (2013.01); *G07F 15/005* (2013.01); *B60L 2230/16* (2013.01); *H01M 10/44* (2013.01); *H01M 2220/20* (2013.01); *Y02T 10/705* (2013.01); *Y02T 10/7005* (2013.01); *Y02T 10/7044* (2013.01); *Y02T 10/7088* (2013.01); *Y02T 90/121* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2010/0013434 A1* | 1/2010 | Taylor-Haw | B60L 11/1818 320/109 |
| 2010/0156349 A1 | 6/2010 | Littrell | |
| 2010/0217642 A1* | 8/2010 | Crubtree et al. | 705/8 |
| 2010/0225475 A1* | 9/2010 | Karch | B60L 11/1848 340/540 |
| 2011/0000726 A1 | 1/2011 | Tanaka | |
| 2011/0022222 A1* | 1/2011 | Tonegawa | B60L 8/003 700/232 |
| 2011/0145141 A1 | 6/2011 | Blain | |
| 2011/0298422 A1* | 12/2011 | Failing | B60L 3/00 320/109 |
| 2012/0049785 A1* | 3/2012 | Tanaka | B60L 3/0046 320/106 |
| 2012/0116575 A1* | 5/2012 | Prosser | G06Q 20/202 700/232 |
| 2012/0136705 A1* | 5/2012 | Enmei | B60L 11/1816 705/14.17 |
| 2012/0166011 A1* | 6/2012 | Oba et al. | 700/297 |
| 2012/0290473 A1* | 11/2012 | Ree et al. | 705/40 |

FOREIGN PATENT DOCUMENTS

| | | |
|---|---|---|
| JP | 2004-118498 A | 4/2004 |
| JP | 2007-066278 | 3/2007 |
| JP | 2009-205200 | 9/2009 |
| JP | 2010-028913 | 2/2010 |
| JP | 2010-110044 A | 5/2010 |
| JP | 2010-161899 | 7/2010 |
| JP | 2010166794 A | 7/2010 |
| JP | 2010-230345 | 10/2010 |
| JP | 2011-087356 | 4/2011 |
| KR | 100988044 B1 | 10/2010 |
| WO | WO-2012/042902 A1 | 4/2012 |

OTHER PUBLICATIONS

Shinpei Chihara, Technical Development That Supports to Built Charging-Infrastructure for Electric Vehicle, NEC Technical Journal, Feb. 1, 2012, vol. 65 No. 1, pp. 19-23.

International Search Report PCT/JP2013/056131, dated Apr. 2, 2013, 2 pages.

Extended European Search Report issued by the European Patent Office for Application No. 13782108.8 dated Dec. 1, 2015 (10 pages).

Japanese Office Action issued by the Japan Patent Office for Japanese Application No. 2016-226093 dated Dec. 5, 2017 (6 pages).

* cited by examiner

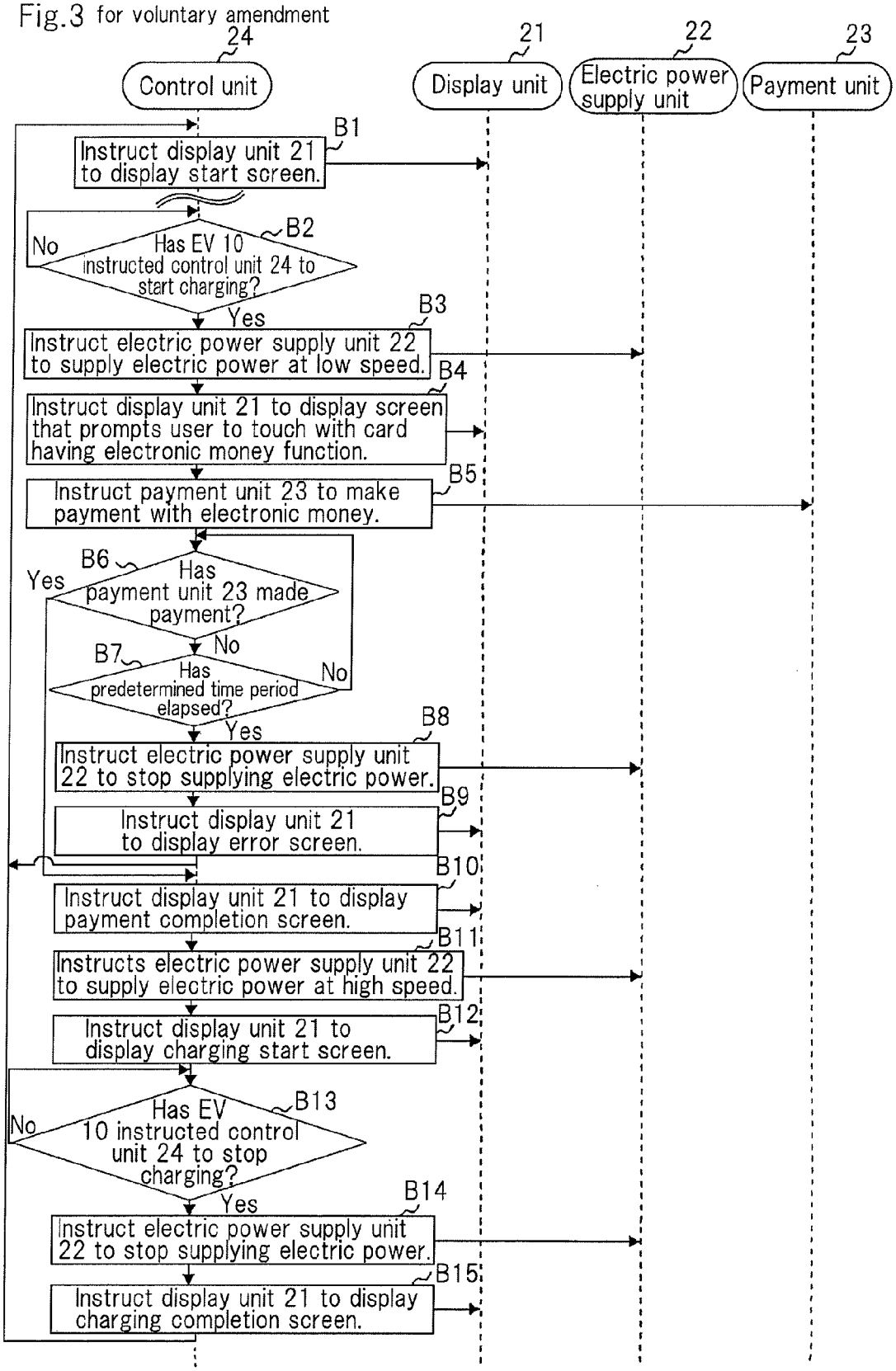

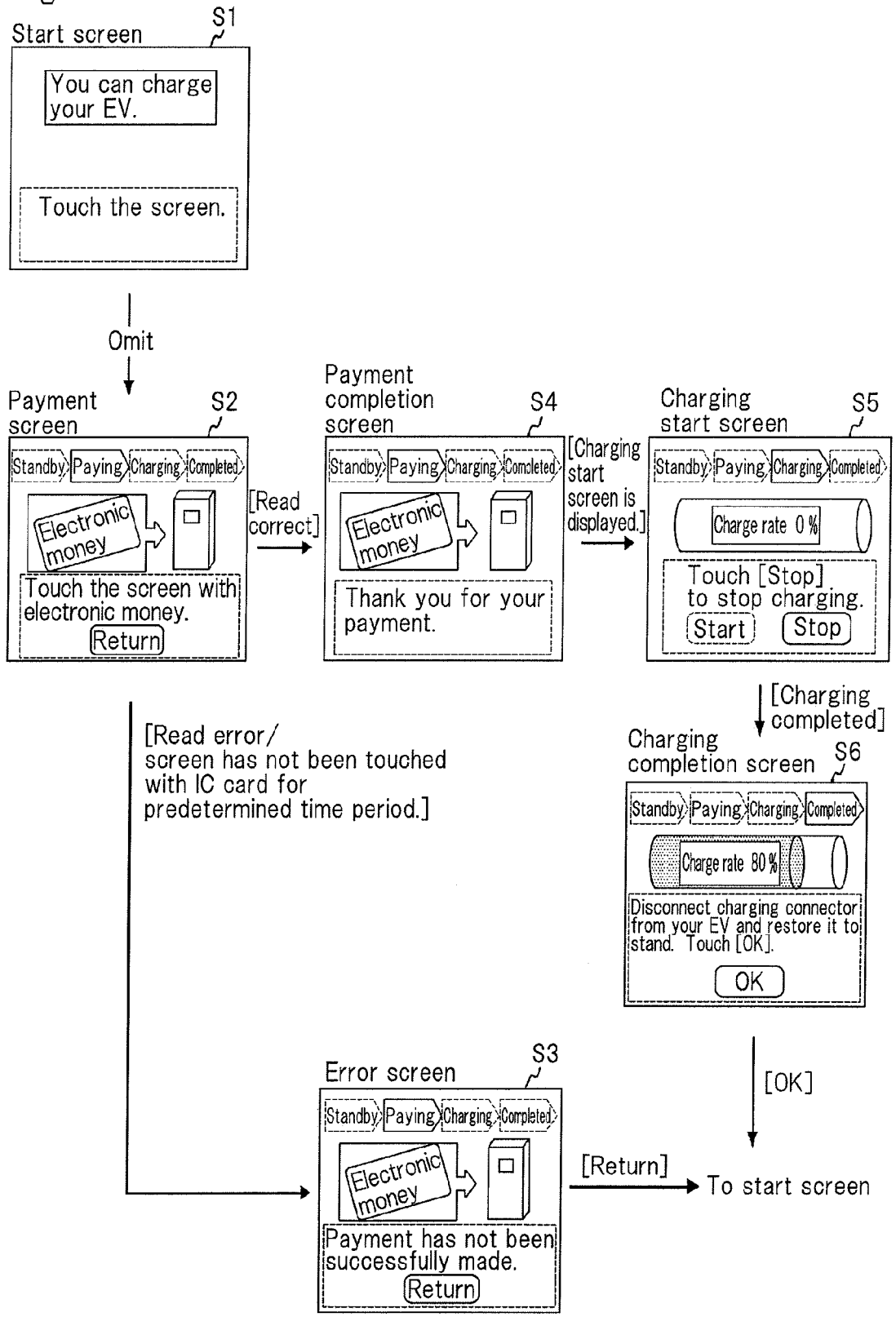

CHARGER AND CHARGING METHOD

This application is a national stage application of prior International Application No. PCT/JP2013/056131, entitled "Charger and Charging Method," filed on Mar. 6, 2013, which claims the benefit of and priority to JP Application No. 2012-102926, filed Apr. 27, 2012, the disclosure of each of which is hereby incorporated by reference in its entirety for all purposes

TECHNICAL FIELD

The present invention relates to technologies that makes with electronic money to use a charger that charges a rechargeable battery mounted on an EV (Electric Vehicle).

BACKGROUND ART

In recent years, a number of technologies that make payment with electronic money to use an EV charger that charges a rechargeable battery mounted on an EV have been proposed.

For example, a technology that makes payment to use an EV charger and then allows the EV charger to charge the EV has been disclosed in Patent Literature 1.

RELATED ART LITERATURE

Patent Literature

Patent Literature 1: JP2010-028913A

SUMMARY OF THE INVENTION

Problem to be Solved by the Invention

Recently, standardization for CHAdeMO (CHArge de MOve) specifications as an EV charging system has been studied.

The CHAdeMO specifications are designed to allow the EV side to control start and stop of charging. In other words, the CHAdeMO specifications do not allow the EV charger side to control start and stop of charging.

Thus, since an EV charger according to the CHAdeMO specifications does not have a stopping point at which payment can be made with electronic money before and after the EV charger starts charging, payment to use the EV charger cannot be made at a stopping point before the EV charger starts charging like Patent Literature 1.

In addition, according to the CHAdeMO specifications, after the EV charger has successfully charged the EV, a charging connector of the EV charger is unlocked such that it can be connected to and disconnected from the EV.

Thus, in the EV charger according to the CHAdeMO specifications, it is likely that after EV charger has charged the EV, the charging connector is disconnected from the EV. Thus, even if the EV charger has a stopping point after the EV charger stops charging, it is likely that payment to use the EV charger will not be made.

As a result, in the EV charger according to the CHAdeMO specifications, it is likely that payment to use the EV charger will not be made.

Therefore, an object of the present invention is to solve the foregoing problem and to provide a technology that prevents payment to use the charger from not being made.

Means that Solve the Problem

A charger according to the present invention is a charger that charges a rechargeable battery mounted on an electric vehicle, comprising:

an electric power supply unit that supplies electric power to said rechargeable battery;

a payment unit that makes payment with electronic money to use said charger; and a control unit, when said control unit is instructed by said electric vehicle to start charging, that instructs said electric power supply unit to start supplying electric power to said rechargeable battery and that instructs said payment unit to make payment with said electronic money.

A charging method according to the present invention is a charging method for a charger that charges a rechargeable battery mounted on an electric vehicle, comprising the step of:

when instructed by said electric vehicle to start charging, starting supplying electric power to said rechargeable battery and making payment with electronic money.

Effect of the Invention

According to the present invention, since payment with electronic money to use the charger is made immediately after the charger is instructed by the EV to start charging, payment to use the charger can be prevented from not being made.

BRIEF DESCRIPTION OF DRAWINGS

FIG. 3 is a sequence diagram describing operations performed while the EV charger shown in FIG. 1 is charging the EV.

FIG. 4 is a schematic diagram describing a screen transition that occurs while the EV charger shown in FIG. 1 is charging the EV.

DESCRIPTION OF EMBODIMENTS

Next, with reference to the accompanying drawings, exemplary embodiments of the present invention will be described.

Figure 1:
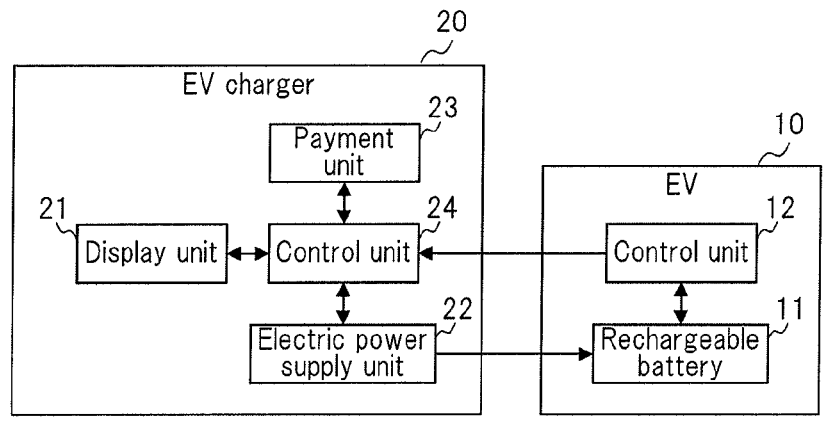
FIG. 1 is a block diagram showing the structure of a charging system including an EV charger according to an exemplary embodiment of the present invention.

FIG. 1 is a block diagram showing the structure of a charging system including an EV charger according to this exemplary embodiment.

The charging system shown in FIG. 1 has EV 10 and EV charger 20.

EV 10 has rechargeable battery 11 and control unit 12.

Rechargeable battery 11 is charged with electric power supplied from EV charger 20. Although EV 10 is driven with electric power charged to rechargeable battery 11, the structure of the driving system of EV 10 is beyond the scope of the present invention, but known in the art. Thus, description of the structure of the driving system of EV 10 will be omitted in this specification.

Control unit 12 controls structural components of EV 10 so as to perform various processes.

EV charger 20 has display unit 21, electric power supply unit 22, payment unit 23, and control unit 24.

Display unit 21 displays various screens while EV charger 20 is charging EV 10.

Electric power supply unit 22 supplies electric power to rechargeable battery 11 of EV 10.

Payment unit 23 makes payment with electronic money to use EV charger 20 borne by EV 10. It is assumed that payment to use EV charger 20 is flat regardless of electric power supply quantity (flat rate).

Control unit 24 controls structural components of EV charger 20 so as to perform various processes.

Next, the operations of the charging system shown in FIG. 1 will be described.

First, with reference to FIG. 2, the operations of the charging system shown in FIG. 1 performed while EV charger 20 is charging EV 10 will be described.

Figure 2:
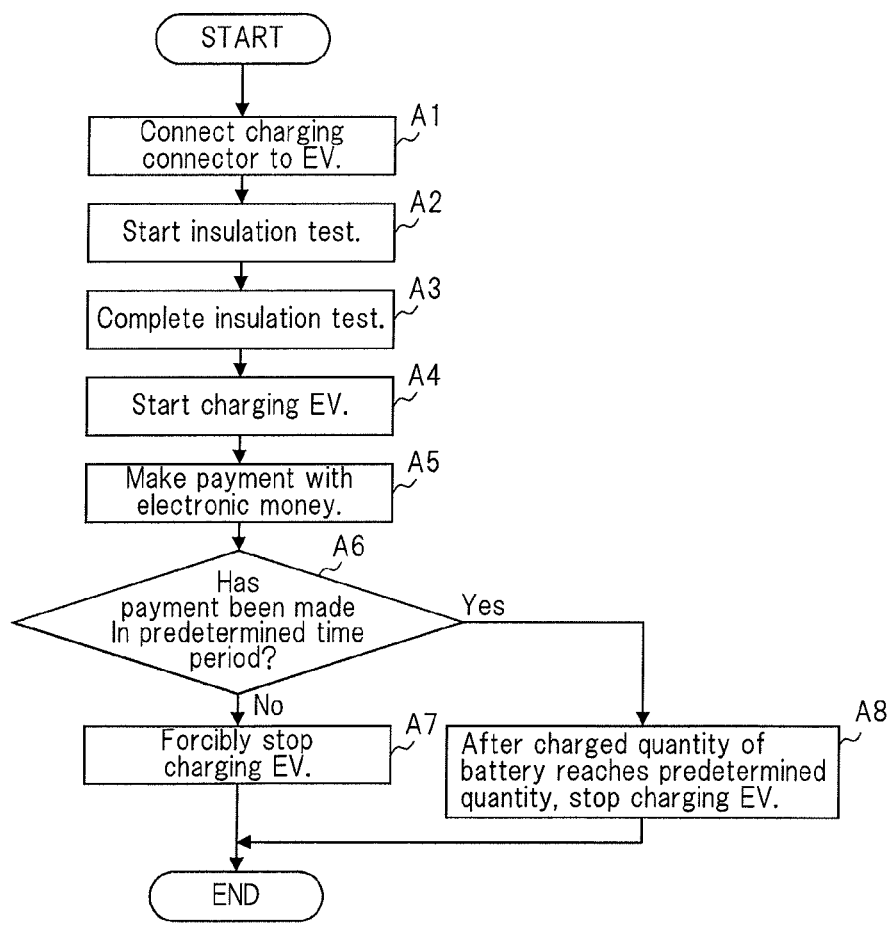
FIG. 2 is a flow chart describing operations performed while the charging system shown in FIG. 1 is charging the EV.

As shown in FIG. 2, the user of EV charger 20 connects the charging connector of EV charger 20 to EV 10 (at step A1).

Thereafter, control unit 24 of EV charger 20 starts an insulation test for a charging cable that connects the main body of EV charger 20 and the charging connector (at step A2). Since the method for the insulation test is beyond the scope of the present invention, but is known in the art, the description of the method of the insulation test will be omitted in this specification. After the insulation test is started, the charging connector is locked such that it cannot be connected to and disconnected from EV 10.

After the insulation test is completed (at step A3), control unit 12 of EV 10 instructs EV charger 20 to start charging (at step A4). When EV charger 20 is instructed to do so, control unit 24 of EV charger 20 instructs electric power supply unit 22 to start supplying electric power to EV 10.

When control unit 24 of EV charger 20 is instructed by EV 10 to start charging, control unit 24 instructs payment unit 23 to make payment with electronic money to use EV charger 20 borne by EV 10 (at step A5). Thereafter, control unit 24 checks whether or not payment has been made in a predetermined time period (at step A6).

If payment has not been made in the predetermined time period (No at step A6), control unit 24 of EV charger 20 instructs electric power supply unit 22 to forcibly stop supplying electric power to EV 10 (at step A7).

In contrast, if payment has been made in the predetermined time period (Yes at step A6), when the charged quantity of rechargeable battery 11 reaches a predetermined quantity (in the case of a quick charger, the charge rate of rechargeable battery 11 reaches 80%), control unit 12 of EV 10 instructs EV charger 20 to stop charging rechargeable battery 11 (at step A8). When control unit 24 of EV charger 20 is instructed to do so, control unit 24 of EV charger 20 instructs electric power supply unit 22 to stop supplying electric power to EV 10.

After charging is completed at step A7 and step A8, the charging connector is unlocked such that it can be connected to and disconnected from EV 10.

Next, with reference to FIG. 3 and FIG. 4, the operations will be described together with screens that are displayed while EV charger 20 shown in FIG. 1 is charging EV 10.

As shown in FIG. 3, control unit 24 instructs display unit 21 to display a start screen (at step B1). When display unit 21 is instructed to do so, display unit 21 displays, for example, start screen S1 shown in FIG. 4.

When the user uses EV charger 20 for EV 10, the user touches start screen S1. Thereafter, the user connects the charging connector of EV charger 20 to EV 10. Thereafter, the insulation test is started. Description of these operations and screens that appear while these operations are being performed will be omitted. As described above, after the insulation test is conducted, the charging connector is locked such that it cannot be connected to and disconnected from EV charger 20.

After the insulation test is completed and control unit 24 is instructed by EV 10 to start charging (Yes at step B2), control unit 24 instructs electric power supply unit 22 to start supplying electric power to EV 10. At this point, control unit 24 instructs electric power supply unit 22 to supply electric power to EV 10 at a first speed that is low speed (for example, the lowest speed) as a electric power supply speed that represents electric power supply quantity per unit time (at step B3). When electric power supply unit 22 is instructed to do so, electric power supply unit 22 decreases the electric power supply speed to the first speed and starts supplying electric power to EV 10 at the first speed.

Thereafter, control unit 24 instructs display unit 21 to display a payment screen that prompts the user to touch with an IC (Integrated Circuit) card that has an electronic money function (at step B4). When display unit 21 is instructed to do so, display unit 21 displays, for example, payment screen S2 shown in FIG. 4.

Although EV charger 20 has started charging EV 10 at step B4, payment screen S2 does not show that EV charger 20 has charged EV 10. Thus, payment screen S2 would prompt the user who wants to charge EV 10 to touch with the IC card in a proactive manner.

Control unit 24 instructs payment unit 23 to make payment with electronic money to use EV charger 20 (at step B5). When payment unit 23 is instructed to do so, payment unit 23 makes payment with electronic money. Specifically, when payment screen S2 is touched with an IC card, payment unit 23 reads information that is needed for payment (electronic money value, user identification, and so forth) from the IC card and makes payment with electronic money based on the information that has been read from the IC card.

Thereafter, control unit 24 checks whether or not payment unit 23 has made payment with electronic money in the predetermined time period after control unit 24 has been instructed by EV 10 to start charging (at steps B6 and B7).

The case in which payment is not successfully made with electronic money includes the case in which payment screen S2 is not touched with an IC card and the case in which even if payment screen S2 is touched with an IC card, a read error occurs in the IC card. The case in which payment is successfully made with electronic money includes the case in which payment screen S2 is touched with an IC card, information is correctly read from the IC card, and payment is successfully made.

If payment has not been made in the predetermined time period (Yes at step B7), control unit 24 instructs electric power supply unit 22 to forcibly stop supplying electric power to EV 10 (at step B8). When electric power supply unit 22 is instructed to do so, electric power supply unit 22 stops supplying electric power to EV 10.

In addition, control unit 24 instructs display unit 21 to display an error screen that shows that payment has not been successfully made with electronic money (at step B9). When display unit 21 is instructed to do so, display unit 21 displays, for example, error screen S3 shown in FIG. 4. After error screen S3 appears, the charging connector is unlocked such that it can be connected to and disconnected from EV charger 20. Thereafter, the flow returns to step B1 again and then start screen S1 appears.

In contrast, if payment has been made in the predetermined time period (Yes at step B6), control unit 24 instructs display unit 21 to display a payment completion screen that shows that payment has been successfully made with electronic money (at step B10). When display unit 21 is instructed to do so, display unit 21 displays, for example, payment completion screen S4 shown in FIG. 4.

In addition, control unit 24 instructs electric power supply unit 22 to increase the electric power supply speed to a second speed that is higher than the first speed (at step B11). When electric power supply unit 22 is instructed to do so, electric power supply unit 22 increases the electric power supply speed to the second speed.

In addition, control unit 24 instructs display unit 21 to display a charging start screen that shows that EV charger 20 has started charging EV 10 (at step B12). When display unit 21 is instructed to do so, display unit 21 displays, for example, charging start screen S5 shown in FIG. 4.

Although EV charger 20 has started charging EV 10 at step B12, charging start screen S5 allows the user to determine that EV charger 20 has started charging EV 10 at this point.

Thereafter, when control unit 24 is instructed by EV 10 to stop charging (Yes at step B13), control unit 24 instructs electric power supply unit 22 to stop supplying electric power to EV 10 (at step B14). When electric power supply unit 22 is instructed to do so, electric power supply unit 22 stops supplying electric power to EV 10.

In addition, control unit 24 instructs display unit 21 to display a charging completion screen that shows that EV charger 20 has completely charged EV 10 (at step B15). When display unit 21 is instructed to do so, display unit 21 displays, for example, charging completion screen S6 shown in FIG. 4. After charging completion screen S6 appears, the charging connector is unlocked such that it can be connected to and disconnected from EV charger 20. Thereafter, the flow returns to step B1 again and then start screen S1 appears.

As described above, according to this exemplary embodiment, payment is made with electronic money to use EV charger 20 immediately after EV charger 20 is instructed by EV 10 to start charging (no stopping point). As a result, payment to use EV charger 20 can be prevented from not being made as an effect of this exemplary embodiment.

If payment has not been made with electronic money after the predetermined time period has elapsed, EV charger 20 forcibly stops charging EV 10. As a result, if payment to use EV charger 20 has not been made, electric power quantity for EV 10 can be suppressed.

Before payment is made with electronic money, EV charger 20 charges EV 10 at a low speed (first speed). After payment is made with electronic money, EV charger 20 charges EV 10 at a high speed (second speed). As a result, if payment to use EV charger 20 has not been made, the electric power quantity for EV 10 can be further suppressed.

Before payment is made with electronic money, EV charger 20 causes a screen to appear so as to prompt the user to touch with an IC card that has an electronic money function. Although EV charger 20 has progressively charged EV 10, such a screen appears so as to prompt the user to touch EV charger 20 with the IC card in a proactive manner.

The present invention has been described with reference to the exemplary embodiments. However, it should be understood by those skilled in the art that the structure and details of the present invention may be changed in various manners without departing from the scope of the present invention.

The present application claims priority based on Japanese Patent Application JP 2012-102926 filed on Apr. 27, 2012, the entire contents of which are incorporated herein by reference in its entirety.

The invention claimed is:

1. A charger that charges a rechargeable battery, wherein said rechargeable battery is mounted on an electric vehicle, comprising:
   an electric power supply unit that supplies electric power to said rechargeable battery;
   a payment unit that makes payment with electronic money to use said charger; and
   a control unit that, when said control unit is instructed by said electric vehicle to start charging, that causes said electric power supply unit to start supplying electric power to said rechargeable battery and then, that reads information that is needed for payment, and instructs said payment unit to make payment with said electronic money,
   wherein if said payment unit has not made payment with said electronic money after said control unit has been instructed by said electric vehicle to start charging and a predetermined time period has elapsed, said control unit instructs said electric power supply unit to stop supplying electric power to said rechargeable battery
   wherein after said control unit has been instructed by said electric vehicle to start charging until said payment unit has made payment with said electronic money, said control unit instructs said electric power supply unit to supply electric power to said rechargeable battery at a first current supply rate, and
   wherein if said payment unit has made payment with said electronic money, said control unit instructs said electric power supply unit to supply electric power to said rechargeable battery at a second current supply rate that is higher than said first current supply rate.

2. The charger as set forth in claim 1, further comprising: a display unit,
   wherein after said control unit has been instructed by said electric vehicle to start charging until said payment unit has made payment with said electronic money, said control unit instructs said display unit to display a screen that prompts the user to touch with an IC card having a function of said electronic money.

3. The charger as set forth in claim 2, Wherein after said control unit has been instructed by said electric vehicle to start charging until said payment unit has made payment with said electronic money, said control unit displays a screen that indicates paying is in progress on said display unit, and after said payment unit has made payment with said electronic money, said control unit displays a screen that indicates charging is in progress on said display unit.

4. A charger that charges a rechargeable battery, wherein said rechargeable battery is mounted on an electric vehicle, comprising:
   an electric power supply unit that supplies electric power to said rechargeable battery;
   a payment unit that makes payment with electronic money in order to use said charger;
   a display unit; and
   a control unit that displays a screen that indicates paying is in progress on said display unit after said control unit has been instructed by said electric vehicle to start charging until said payment unit has been made payment with said electronic money, and that displays a screen that indicates charging is in progress on said display unit after said payment unit has made payment with said electronic money, wherein if said payment unit has not made payment with said electronic money after said control unit has been instructed by said electric vehicle to start charging and a predetermined time period has elapsed, said control unit instructs said electric power supply unit to stop supplying electric power to said rechargeable battery wherein after said control unit has been instructed by said electric vehicle to start charging until said payment unit has made payment with said electronic money, said control unit instructs said electric power supply unit to supply electric power to said rechargeable battery at a first current supply rate, and wherein if said payment unit has made payment with said electronic money, said control unit instructs said electric power supply unit to supply electric power to said rechargeable battery at a second current supply rate that is higher than said first current supply rate.

* * * * *